United States Patent
Giefer et al.

(10) Patent No.: US 11,853,227 B2
(45) Date of Patent: Dec. 26, 2023

(54) DATA PROCESSING APPARATUS AND METHOD FOR PERFORMING ADDRESS TRANSLATION

(71) Applicant: Arm Limited, Cambridge (GB)

(72) Inventors: Charles Andrew Giefer, Austin, TX (US); Alexander Donald Charles Chadwick, Cambridge (GB)

(73) Assignee: Arm Limited, Cambridge (GB)

( * ) Notice: Subject to any disclaimer, the term of this patent is extended or adjusted under 35 U.S.C. 154(b) by 128 days.

(21) Appl. No.: 17/242,729

(22) Filed: Apr. 28, 2021

(65) Prior Publication Data

US 2022/0350750 A1 Nov. 3, 2022

(51) Int. Cl.
*G06F 12/10* (2016.01)
*G06F 12/1045* (2016.01)
(Continued)

(52) U.S. Cl.
CPC ...... *G06F 12/1045* (2013.01); *G06F 12/0238* (2013.01); *G06F 12/1009* (2013.01);
(Continued)

(58) Field of Classification Search
CPC ........... G06F 12/1009; G06F 2212/651; G06F 12/0862; G06F 12/1045; G06F 12/1054; G06F 12/1063; G06F 2212/653
See application file for complete search history.

(56) References Cited

U.S. PATENT DOCUMENTS 7,805,587 B1 * 9/2010 Van Dyke ........... G06F 12/0607
711/6
9,058,268 B1 * 6/2015 Ostiguy ............. G06F 12/0802
(Continued)

FOREIGN PATENT DOCUMENTS

JP 2000-231325 8/2000

OTHER PUBLICATIONS

Gather-Scatter DRAM: In-DRAM Address Translation to Improve the Spatial Locality of Non-unit Strided Accesses by Seshadri (Year: 2017).*
(Continued)

*Primary Examiner* — Paul M Knight
(74) *Attorney, Agent, or Firm* — NIXON & VANDERHYE P.C.

(57) ABSTRACT

There is provided a data processing apparatus and method of data processing. The data processing apparatus comprises storage circuitry to store a hierarchy of page tables comprising an intermediate level page table. Each entry of the intermediate level page table comprises base address information of a next level page table and control information indicating whether an addressing function has been applied to reorder physical storage locations of entries of the next level page table. Address translation circuitry is provided to perform address translations in response to receipt of a virtual address by performing a lookup in a next level page table dependent on the base address information and a page table index from the virtual address. When the control information indicates that the addressing function has been applied, the lookup is performed at a modified storage location generated by applying the addressing function to the page table index.

20 Claims, 8 Drawing Sheets

(51) Int. Cl.
*G06F 12/02* (2006.01)
*G06F 12/1009* (2016.01)
*G06F 12/1036* (2016.01)

(52) U.S. Cl.
CPC ...... *G06F 12/1036* (2013.01); *G06F 12/1054* (2013.01); *G06F 12/1063* (2013.01); *G06F 2212/651* (2013.01); *G06F 2212/653* (2013.01); *G06F 2212/7201* (2013.01)

(56) References Cited

U.S. PATENT DOCUMENTS

| | | | | |
|---|---|---|---|---|
| 10,372,618 | B2* | 8/2019 | Dooley | G06F 12/0802 |
| 11,176,055 | B1* | 11/2021 | Mukherjee | G06F 9/3836 |
| 2008/0005528 | A1* | 1/2008 | Morris | G06F 12/1036 |
| | | | | 711/E12.065 |
| 2009/0198909 | A1* | 8/2009 | Speight | G06F 12/0862 |
| | | | | 711/137 |
| 2015/0026414 | A1* | 1/2015 | Kalamatianos | G06F 12/06 |
| | | | | 711/137 |
| 2015/0134933 | A1* | 5/2015 | Holm | G06F 9/383 |
| | | | | 712/207 |
| 2018/0011651 | A1* | 1/2018 | Sankaran | G06F 12/1009 |
| 2018/0307617 | A1* | 10/2018 | Harris | G06F 12/1009 |
| 2020/0073819 | A1* | 3/2020 | Blake | G06F 12/1009 |
| 2020/0242047 | A1* | 7/2020 | Evans | G06F 16/2282 |

OTHER PUBLICATIONS

Leveraging Access Port Positions to Accelerate Page Table Walk in DWM-based Main Memory by Khouzani (Year: 2017).*
Efficient Address Remapping in Distributed Shared-Memory Systems by Zhang (Year: 2006).*
Computer Architecture by Hennessy and Patterson (Year: 2007).*
POSTER SpiDRE Accelerating Sparse Memory Access Patterns 2019 by Barredo (Year: 2019).*
International Search Report and Written Opinion of the International Searching Authority for PCT/GB2022/050675 dated Jun. 8, 2022, 15 pages.

* cited by examiner

DATA PROCESSING APPARATUS AND METHOD FOR PERFORMING ADDRESS TRANSLATION

TECHNICAL FIELD

The present invention relates to data processing. More particularly the present invention relates to address translation.

BACKGROUND

Some data processing apparatuses are provided with address translation circuitry to perform translations between virtual addresses used by the data processing apparatus and physical addresses at which data or instructions are stored. In some data processing apparatuses the address translation circuitry performs the virtual-to-physical address translation using a hierarchy of page tables stored in storage circuitry. For example, the translation circuitry may sequentially look up different levels of page table in the page table hierarchy based on a combination of information present in the virtual address and information that has been returned from a lookup in a preceding page table of the page table hierarchy. Page table lookups require accesses to memory to return physical addresses corresponding to the virtual address and can be time consuming. The time cost can be reduced by looking up sequential addresses referred to in the page table in parallel. However, the benefit of this approach is limited to cases in which the data processing apparatus requires translations to virtual addresses which are sequentially defined within the page table hierarchy.

SUMMARY

In example embodiments described herein there is provided a data processing apparatus comprising: storage circuitry to store a hierarchy of page tables comprising an intermediate level page table comprising a plurality of entries, each comprising corresponding base address information of a corresponding next level page table and corresponding control information indicating whether an addressing function has been applied to reorder physical storage locations of entries of the corresponding next level page table; and address translation circuitry to perform a virtual-to-physical address translation using the hierarchy of page tables in response to receipt of a virtual address, the virtual-to-physical address translation comprising performing a lookup in a next level page table dependent on base address information defined in an entry of the intermediate level page table and a page table index generated based on a portion of the virtual address, wherein the address translation circuitry is adapted such that, in response to control information of the entry indicating that the addressing function has been applied, the lookup in the next level page table is performed at a modified storage location generated by applying the addressing function to the page table index.

In example embodiments described herein there is provided a data processing method comprising: storing a hierarchy of page tables comprising an intermediate level page table comprising a plurality of entries, each comprising corresponding base address information of a corresponding next level page table and corresponding control information indicating whether an addressing function has been applied to reorder physical storage locations of entries of the corresponding next level page table; and performing a virtual-to-physical address translation using the hierarchy of page tables in response to receipt of a virtual address, the virtual-to-physical address translation comprising performing a lookup in a next level page table dependent on base address information defined in an entry of the intermediate level page table and a page table index generated based on a portion of the virtual address, wherein in response to control information of the entry indicating that the addressing function has been applied, the lookup in the next level page table is performed at a modified storage location generated by applying the addressing function to the page table index.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Figure 1:
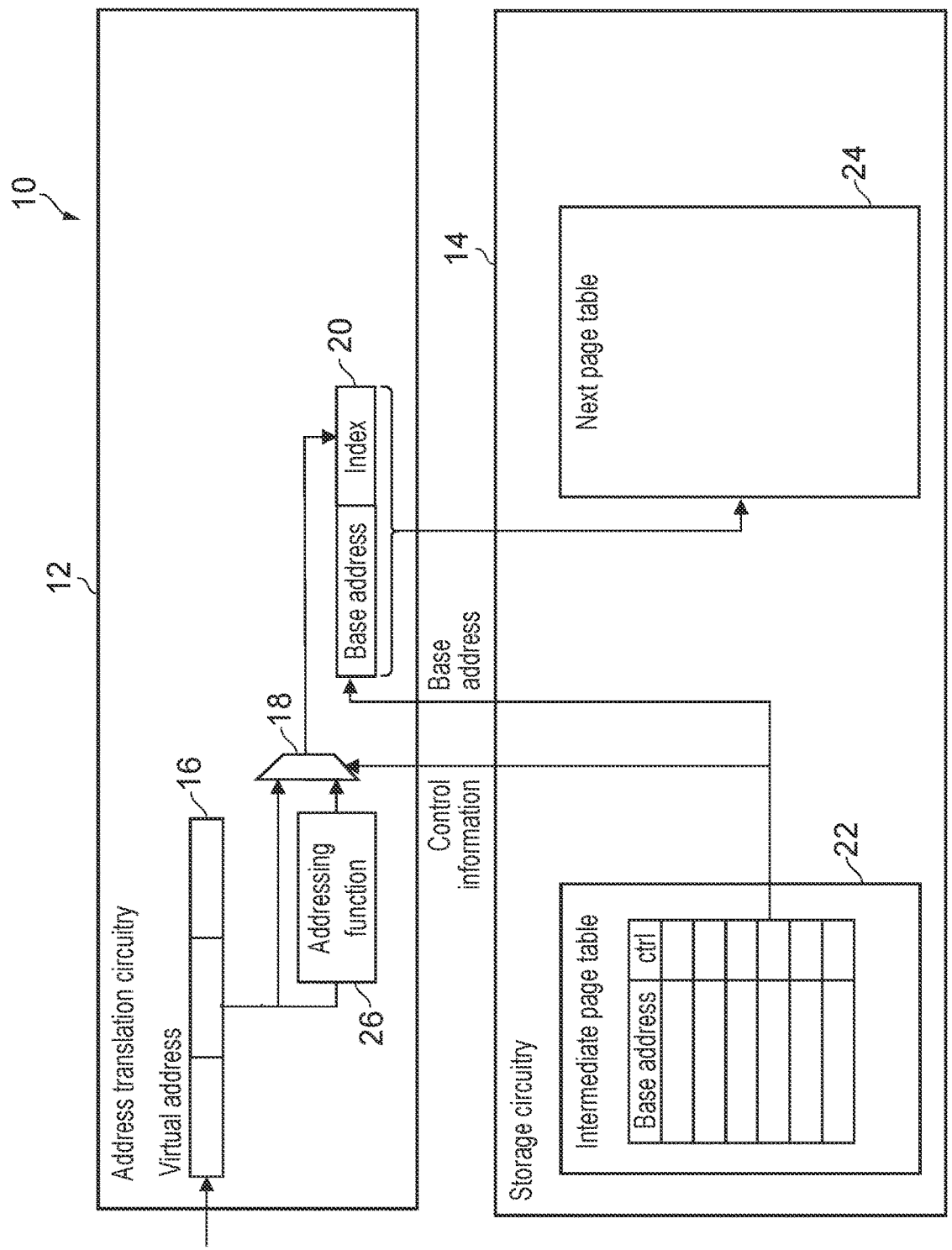
FIG. 1 schematically illustrates a data processing apparatus comprising address translation circuitry and storage circuitry according to some example configurations.

Before discussing the embodiments with reference to the accompanying figures, the following description of embodiments is provided.

In accordance with one example configuration there is provided a data processing apparatus. The data processing apparatus comprises storage circuitry to store a hierarchy of page tables comprising an intermediate level page table. The intermediate level page table comprises a plurality of entries, each comprising corresponding base address information of a corresponding next level page table and corresponding control information indicating whether an addressing function has been applied to reorder physical storage locations of entries of the corresponding next level page table. The data processing apparatus further comprises address translation circuitry to perform a virtual-to-physical address translation using the hierarchy of page tables in response to receipt of a virtual address. The virtual-to-physical address translation comprises performing a lookup in a next level page table dependent on base address information defined in an entry of the intermediate level page table and a page table index generated based on a portion of the virtual address. Furthermore, the address translation circuitry is adapted such that, in response to control information of the entry indicating that the addressing function has been applied, the lookup in the next level page table is performed at a modified storage location generated by applying the addressing function to the page table index.

The address translation circuitry performs the virtual-to-physical address translation by sequentially looking up page tables in the hierarchy of page tables. The hierarchy of page tables includes at least an intermediate level page table and a next level page table. In some example configurations the hierarchy of page tables may comprise four levels of page tables including a top level page table (L0 page table), two levels of intermediate page tables (L1 page table and L2 page table) and lowest level page tables (L3 page table). When multiple levels of page table are included, the intermediate level page table can be any of the intermediate level page tables with a next level page table corresponding to the page table referred to in the intermediate level page table. This may be, for example, a further intermediate level page table or the lowest level page table. Subsequent to a lookup in an intermediate level page table, in which a base address for a next page table entry is defined, the address translation circuitry performs a lookup at an address defined from the base address and a portion of the virtual address. For example, the lookup in the next level page table could involve generating an address by appending an index (otherwise referred to as an offset) derived from a portion of the virtual address to the base address. The index can be derived in different ways. In some example configurations the index could be the portion of the virtual address and in other alternative example configurations the index could be a portion of an intermediate address which has been looked up or derived from the portion of the virtual address. Each lookup performed by the address translation circuitry requires an access to memory which can be time consuming. In some systems the number of lookups that are required for translating addresses can be reduced by reading plural sequential entries of the next level page table during the lookup in the next level page table. For example, a number of entries that can be stored within a cache line of a caching device associated with the address translating circuitry could be read in a single memory access. Indeed, where the memory system may be configured to retrieve blocks of data from memory which correspond to the cache line size in order to make more efficient use of the access bandwidth. This approach can only reduce the number of lookups that are required when the data processing apparatus requires entries from the next level page table that are sequential. The inventors have realised that further advantage can be obtained by applying an addressing function to reorder the physical storage locations of entries of the next level page table such that the entries that are looked up by the data processing apparatus appear in sequential locations in the page table entry. By applying the addressing function to reorder the physical storage locations and by applying the same addressing function during the lookup in the next level page table, the address translation circuitry is able to take advantage of the contiguity of entries in the modified locations and reduce the total number of lookups required. The application of the addressing function is recorded as control information included within each of the page table entries. When the control information indicates that the entries of the corresponding next level page table have been reordered then the address translation circuitry applies the addressing function to the lookup in the next level page table entry. When the control information indicates that the entries of the corresponding next level page table have not been reordered, or for legacy configurations in which there is no control information, the address translation circuitry bypasses the step of applying the addressing function to the page table index and performs the lookup using the index generated from the virtual address.

The addressing function can be defined in various ways, however in some example configurations the addressing function maps a strided sequence of virtual addresses to a contiguous sequence of physical storage locations in the storage circuitry. Strided accesses are common in data processing. Hence, by mapping a strided sequence of virtual addresses to a contiguous sequence of physical storage locations, the number of accesses to memory can be reduced. In other example configurations the addressing function could map a first address offset pattern to a contiguous sequence of physical storage locations. The first address offset pattern could be defined by a programmer based on knowledge of likely access patterns or could be defined by software analysing sequential access patterns. In some example configurations the addressing function provides a one-to-one mapping between the page table index and a modified page table index generated by applying the addressing function to the page table index.

In some example configurations the strided sequence comprises a stride length and each page table index generated from the strided sequence of virtual addresses differs from a preceding page table index generated from a preceding virtual address of the sequence of virtual addresses by the stride length. For example, the strided sequence could comprise addresses separated by a stride length of 32 entries. Such a stride length may be used, for example, in arithmetic operations involving matrices. Sequential entries in the page tables may be defined for numerical values stored in sequential rows in a matrix. However, dependent on the operation being performed accesses to sequential columns may be required. In such examples, the addressing function could be defined to map entries that are in sequential columns (separated by, for example, 32 entries) to contiguous entries in the next level page table.

In some example configurations each page table index generated from the strided sequence of virtual addresses comprises a least significant portion and a more significant portion; the least significant portion of each page table index is a same least significant portion; and each more significant portion corresponds to a sequentially previous more significant portion incremented by a single value. Strided sequences comprising a same least significant portion correspond to addresses separated by a number of entries that is a power of $2^n$, where n is an integer. For example, entries separated by 32 locations within the next level page table could comprise 13 bit page table indexes for which the 5 least significant bits are the same and for which the remaining bits are sequentially incrementing. An example of such a sequence of indexes is:

| 13 bit index | More significant portion | Least significant portion |
| --- | --- | --- |
| 1101011001101 | 11010110 | 01101 |
| 1101011101101 | 11010111 | 01101 |
| 1101100001101 | 11011000 | 01101 |
| 1101100101101 | 11011001 | 01101 |

-continued

| 13 bit index | More significant portion | Least significant portion |
|---|---|---|
| 1101101001101 | 11011010 | 01101 |

In the above example the five least significant bits (01101) are the same for each of the 13 bit indexes and the more significant portion is incremented by a single value (single bit) for each sequential index.

The addressing function may be defined in a variety of ways. For example, the addressing function may comprise a lookup table that maps the page table index to reordered storage location. Alternatively, an arithmetic operation could be used to map the page table index to the reordered storage location. In some example configurations in which the virtual addresses comprises a same least significant portion and a more significant portion that increments by a single value, the addressing function swaps an order of the least significant portion and the more significant portion. For example, when the above example sequence of indexes is used, the addressing function modifies the 13 bit index to correspond to the following contiguous storage locations:

| 13 bit index | Index modified by the addressing function |
|---|---|
| [11010110][01101] | [01101][11010110] |
| [11010111][01101] | [01101][11010111] |
| [11011000][01101] | [01101][11011000] |
| [11011001][01101] | [01101][11011001] |
| [11011010][01101] | [01101][11011010] |

Thus, this approach provides an addressing function that renders strided accesses contiguous by swapping the more significant portion and the least significant portion of the index. The choice of 32 entries for the entry separation is for illustrative purposes only and the skilled person would understand that any number of bits could be chosen for the least significant portion and the more significant portion dependent on the particular strided access pattern.

In some alternative configurations the least significant portion comprises a predetermined number of bits; and the addressing function shifts the more significant portion by the predetermined number of bits towards the least significant end of the page table index, and introduces a predetermined portion at a more significant end of the page table index. Rather than using the least significant portion of the entries in the next level page table, the addressing function uses a predetermined portion of the predetermined number of bits. Where the predetermined number of bits is the same length (same number of bits) as the least significant portion. The more significant portion is shifted towards the least significant end of the index (right shifted) by the predetermined number of bits and the predetermined portion is introduced at the most significant end, for example, by right shifting in each bit of the predetermined portion. For example, based on the 13 bit index in the previous example, where the predetermined function is 0000, the index is modified by the addressing function as follows:

| 13 bit index | Index modified by the addressing function |
|---|---|
| [11010110][01101] | [00000][11010110] |
| [11010111][01101] | [00000][11010111] |
| [11011000][01101] | [00000][11011000] |
| [11011001][01101] | [00000][11011001] |
| [11011010][01101] | [00000][11011010] |

It would be apparent to the person of ordinary skill in the art that the choice of predetermined function is arbitrary and any predetermined function can be used. An advantage of the addressing function is that redundant entries of the next level page table are removed resulting in a compact next level page table.

The next level page table may be any page table of the hierarchy of page tables, for example the next level page table could be an intermediate level page table. However, in some example configurations the next level page table is a final level page table and each entry of the final level page table defines a physical address to be accessed based on a corresponding virtual address received by the address translation circuitry. When this is the case the accessing of plural contiguous entries from the next level page table corresponds to accessing plural contiguous virtual-to-physical address translations. For example the data processing apparatus may return an entire cache line of physical addresses associated with the lookup in the next level page table.

In some example configurations the data processing apparatus further comprises translation storage circuitry to store recently used virtual-to-physical address translations resulting from lookups in the hierarchy of page tables, wherein the control circuitry is adapted to perform a rewriting procedure to rewrite the next level page table in response to a modification to addressing information associated with the entry of the intermediate level page table. By providing control circuitry that performs the rewriting procedure the reordering of the page tables can be provided with a level of flexibility. In some example configurations the data processing apparatus could be further provided with decode circuitry that is responsive to one or more instructions to provide control signals that cause the control circuitry to perform the rewriting operation. In this way control of the rewriting process can be provided, to the operating system or a programmer providing software, to take advantage of an expected data access pattern by controlling the addressing function.

In some example configurations the control circuitry is adapted to perform the rewriting procedure without modifying content of entries of the next level page table. The rewriting procedure performs the function of reordering the physical storage locations of the entries of the corresponding next level page table. The entries themselves are unmodified by the rewriting. Rather, the same entry is merely copied to a new location retaining the translation unmodified.

In some example configurations the control circuitry is adapted to retain validity of the virtual-to-physical address translations stored in the translation storage circuitry during the rewriting procedure. As it is only the location of the entries that are changed, the virtual-to-physical address translation is unaltered by the rewriting procedure. Hence, any entries that are stored in the translation storage circuitry remain valid throughout the rewriting procedure. In this way the rewriting procedure can be performed efficiently and in parallel to the use of virtual-to-physical address translations that are stored in the translation storage circuitry.

The addressing information can take a variety of forms. However, in some example configurations, the addressing information is the control information. For example, the rewriting procedure could be performed in response to the control information being changed from indicating that the addressing function has not been applied to indicating that the addressing function has been applied, or in response to the control information being changed from indicating that the addressing function has not been applied to indicating that the addressing function has been applied.

In some example configurations, the modification comprises changing the control information to indicate that the addressing function is applied; and the control circuitry is adapted to, when performing the rewriting procedure: copy each entry of the next level page table from a current physical location defined based on a current offset from the base address information to a new physical storage location defined dependent on a new base address and a new offset; define the new offset based on the addressing function and the current offset; and modify the base address in the intermediate level page table to correspond to the new base address. The new physical storage location is therefore determined from the new base address modified by the new offset (otherwise referred to as a new index) defined by applying the addressing function to the current offset. For example, the new offset may be appended to the new base address or added to the base address to determine the new physical location. In some example configurations when it is determined that an up to date version of the next level page table already exists at the new physical location, the step of copying each entry of the next level page table may be omitted. In such configurations it may be possible to quickly switch between using and not using the addressing function by changing the control information in the intermediate level page table.

In some example configurations the modification comprises changing the control information to indicate that the addressing function is not applied; and the control circuitry is adapted to, when performing the rewriting procedure: copy each entry of the next level page table from a current physical location defined based on a current offset from the base address information to a new physical storage location defined based on a new base address and a new offset; define the new offset based on an inverse to the addressing function and the current offset; and modify the base address in the intermediate level page table to correspond to the new base address. The new physical storage location is therefore determined from the new base address modified by the new offset (otherwise referred to as the new index) defined by applying the inverse to the addressing function to the current offset. For example, the new offset may be appended to the new base address or added to the base address to determine the new physical storage location. In some example configurations when it is determined that an up to date version of the next level page table already exists at the new physical location, the step of copying each entry of the next level page table may be omitted. In such configurations it may be possible to quickly switch between using and not using the inverse to the addressing function by changing the control information in the intermediate level page table.

As discussed, the addressing information can take a variety of forms and, in some example configurations the addressing information is the addressing function. Hence, the control circuitry is responsive to a change in the addressing function to perform the rewriting procedure to rewrite the next level page table.

In some example configurations the modification comprises changing the addressing function to a modified addressing function; and the control circuitry is adapted to, when the control information indicates that the addressing function has been applied and when performing the rewriting procedure: copy each entry of the next level page table from a current physical location defined based on a current offset from the base address information to a new physical storage location defined dependent on a new base address and a new offset; the new offset is defined based on the modified addressing function, the addressing function, and the current offset; and modify the corresponding base address to indicate the new corresponding base address. For example, the new offset may be appended to the new base address or added to the base address to determine the new physical storage location. In some example configurations the control circuitry is adapted to define the new offset for each entry of the next level page table by applying the modified addressing function to a corresponding original offset obtained by applying an inverse to the addressing function to the current offset. In this way the storage locations of the page table entries are first mapped back to the original order before being remapped using the modified addressing function. As a result the modified addressing function defines the modification that must be made to the page table index obtained based on the virtual address in order to access the correct entry of the next level page table.

In some example configurations the control circuitry is adapted to, when performing the rewriting procedure, rewrite, for each of the plurality of entries in the intermediate level page table with corresponding control information indicating that the addressing function has been applied, the corresponding next level page table. In some example configurations next level page tables that need rewriting are determined by sequentially scanning through the hierarchy of page tables. In some example configurations the control circuitry is configured to maintain a record of entries of the intermediate level page table to which the addressing function has been applied and is further configured to rewrite the corresponding next level page table. In other example configurations the control circuitry stores a record of the addressing function and indicates in each entry of the page table entries which addressing function has been applied to the corresponding next level page table. The entries of the corresponding next level page table can then be rewritten when the corresponding next level page table is next accessed. This reduces the burden of modifying the addressing function by postponing the point at which the rewriting procedure for each next level page table is performed. In some example configurations the address translation circuitry stores a plurality of addressing functions and indicates, in the entries of the intermediate level page table, which addressing function (if any) of the plurality of addressing functions has been applied to the entries of the corresponding next level page table.

The physical storage locations and corresponding physical addresses can be defined based on any minimum unit of physical storage. In some example configurations the physical storage locations are byte addressed. However, in other configurations the physical storage locations may be bit addressed or defined based on any other granularity dependent on the constraints of the data processing apparatus.

The control information can take a variety of forms. For example, the control information could comprise a single bit indicative of whether the addressing function has been applied or not. In some example configurations other information can be added to the control information. For example, in some configurations the control information comprises a contiguity bit representing a hint of sequential usage of a contiguous plurality of entries of the next level page table. In some example configurations, when the control information indicates that the addressing function has not been applied, the contiguous plurality of entries of the next level page table comprise redundant information, and the addressing function modifies physical storage locations of the contiguous plurality of entries such that the redundant information is distributed in non-contiguous locations of the next level page table. In this way the addressing function can be used to group information such that, when a contiguous plurality of entries is read from the next level page table, the contiguous entries comprise non-redundant information thereby increasing the amount of non-redundant data that is read from the page tables in a single data access.

Particular embodiments will now be described with reference to the figures.

FIG. 1 schematically illustrates a data processing apparatus 10 in accordance with some example configurations. The data processing apparatus 10 is provided with address translation circuitry 12 and storage circuitry 14. The storage circuitry 14 stores a hierarchy of page tables 22, 24 including an intermediate page table 22 and corresponding next level page table 24. The page tables comprise a plurality of entries at physical storage locations that are referenced using a base address of the page table and an offset defining a location in the page table of the corresponding entry. The address translation circuitry 12 performs translations from a virtual address to a physical address. The address translation circuitry 12 receives a virtual address 16 which comprises data indicating offsets to be used to define locations in page tables of the hierarchy of page tables. For example, a first portion of the virtual address 16 may indicate an offset to be used to access an entry in a first level page table of the hierarchy of page tables. A second portion of the virtual address 16 may indicate an offset to be used to access an entry of an intermediate level page table 22 of the page table hierarchy. A further portion of the virtual address 16 may indicate an offset to be used to access an entry of a next level page table entry 24. The address translation circuitry 12 performs a lookup in the next level page table 24 using a base address that is determined from an entry of the intermediate page table entry 22 and an index portion determined from the virtual address 16. In accordance with various example configurations of the present techniques the entries of the intermediate level page table further comprise control information which is fed into multiplexer 18. Dependent on the value of the control information the multiplexer 18 selects whether to pass a portion of the virtual address 16 modified by the addressing function 26 or independent of the addressing function 26 to be used in combination with the base address to define an address 20 of an entry of the next level page table. When the control information indicates that entries of the next page table 24 have been reordered the multiplexer 18 passes a portion of the virtual address 16 modified by the addressing function to be used in the address 20. When the control information indicates that entries of the next page table 24 have not been reordered (i.e., the entries of the next page table 24 are in their original order) then the multiplexer 18 passes a portion of the virtual address 16 to be used in the address 20 without applying the addressing function 26 to the portion of the virtual address 16.

Figure 2:
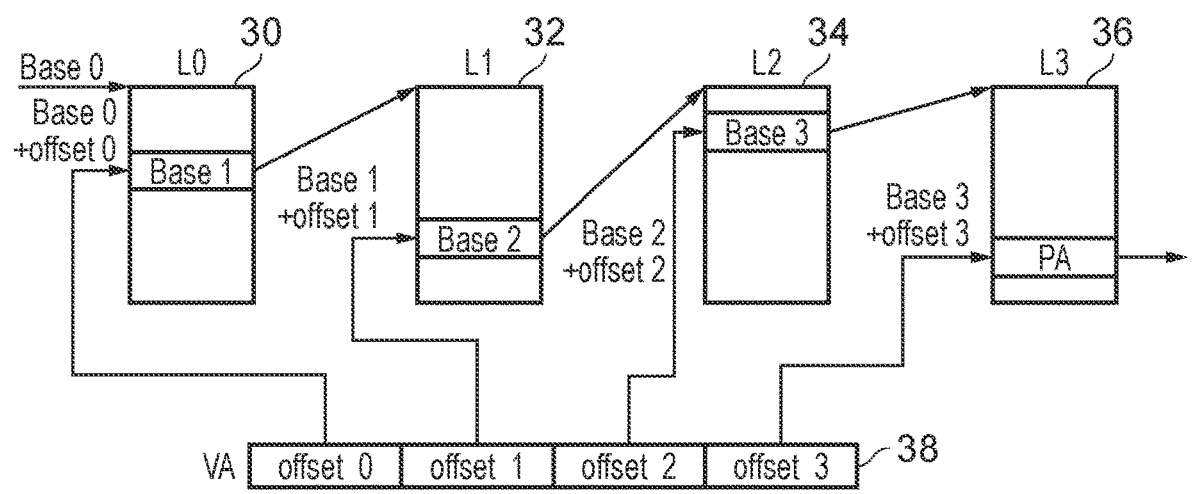
FIG. 2 schematically illustrates a page table walk that is carried out according to some example configurations.

FIG. 2 schematically illustrates a page table walk carried out by the address translation circuitry 12 in response to receiving a virtual address 38 in accordance with some example configurations. In the illustrated embodiment the page table walk traverses four levels of page tables in the hierarchy of page tables: the L0 page table 30, the L1 page table 32, the L2 page table 34, and the L3 page table 36. The virtual address 38 defines four offsets, one associated with each level of the hierarchy of page tables. The page table walk begins with the L0 page table 30. The base address of the L0 page table 30 is stored, for example, in a register and is the same independent of the virtual address 38. The entry in the L0 page table 30 is defined from the base address of the L0 page table 30 and offset 0 stored in the virtual address 38. Depending on the configuration the address of the entries in the page tables may be defined by appending the corresponding offset from the virtual address 38 to the corresponding base address of the page table or by adding the corresponding offset from the virtual address 38 to the base address of the corresponding page table 30. The entry in the L0 page table 30 defines a base address base 1 that points to the L1 page table 32. The entry in the L1 page table 32 is defined from the base address of the L1 page table 32 and offset 1 stored in the virtual address 38. The entry in the L1 page table 32 defines a base address base 2 that points to the L2 page table 34. The entry in the L2 page table 34 is defined from the base address of the L2 page table 34 and offset 2 stored in the virtual address 38. The entry in the L2 page table 34 defines a base address base 3 that points to the L3 page table 36. The entry in the L3 page table 36 is defined from the base address of the L3 page table 36 and offset 3 stored in the virtual address 38. The entry in the L3 page table defines the physical address corresponding to virtual address 38. In the illustrated embodiment, when an entry of the intermediate page tables (L1 page table 32 or L2 page table 34) indicates that the addressing function has been applied to reorder physical storage locations of entries of the corresponding next level page table, the addressing function is applied to the corresponding offset (offset 1 or offset 2) to determine the entry in the next level page table.

Figure 3:
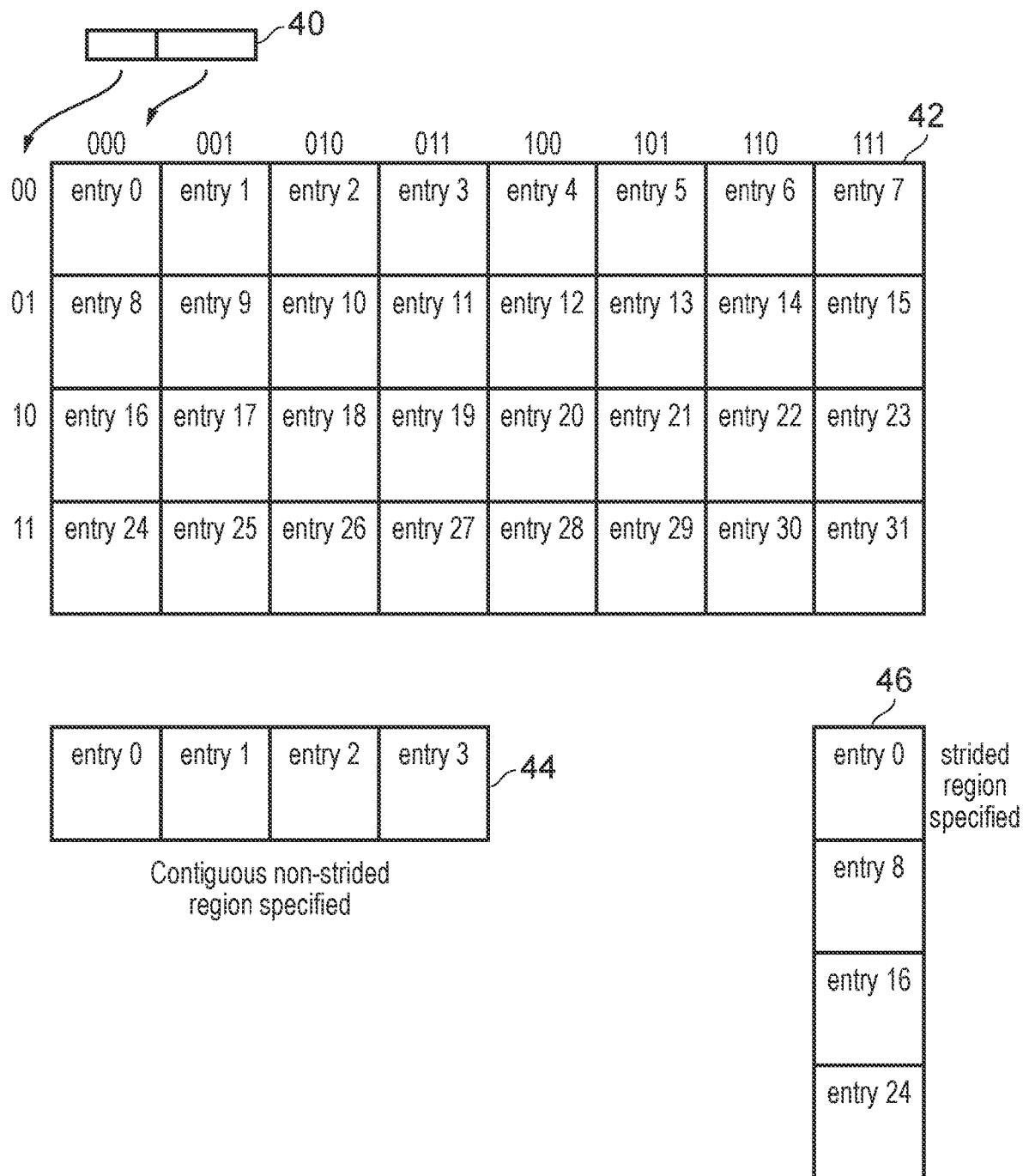
FIG. 3 schematically illustrates an effect of the addressing function according to some example configurations.

FIG. 3 schematically illustrates the difference between blocks of memory that are accessed before and after the application of an addressing function to reorder the physical storage locations of the memory. The entries 42 (entry 0 through to entry 31) represent entries of the next level page table and are numbered in the order in which the entries are recorded in the next level page table. In the illustrated embodiment the entries are accessed based on an index 40 which comprises a least significant portion and a more significant portion. When the next level page table is accessed a contiguous set of entries 44 are read. In this example the contiguous set of entries comprises 4 entries. Hence, if four sequential entries were required, this could be achieved in a single read operation. In general the number of contiguous entries will be defined by the number of entries that fit within a cache line. For example, if the cache line is 512 bits and each entry is 64 bits then the set of contiguous entries will comprise 8 entries. Alternatively, if the cache line was 256 bits and each entry was 64 bits then the set of contiguous entries would comprise 4 entries. When a strided access pattern is used the reading of a contiguous set of entries may provide no additional benefit. For example, if a stride of 8 entries was used such that entries 0, 8, 16 and 24 were required then the entries included in the contiguous sets of entries would be entries 0, 1, 2, and 3; entries 8, 9, 10, and 11; entries 16, 17, 18, and 19; and entries 24, 25, 26, and 27. Hence, four read operations would be made and 12 redundant entries (entries 1, 2, 3, 9, 10, 11, 17, 18, 19, 25, 26, and 27) would be read. However, when the page table entry is reordered according to an addressing function in which the least significant portion of the index 40 and the more significant portion of the index 40 are swapped then the illustrated entries 42 would be read in a column first manner rather than a row first manner. As such the contiguous entries that are read when the addressing function is applied would be entries 0, 8, 16, and 24 in a single read operation. Hence, when the addressing function is used with a strided access pattern redundant entries are not included in the read operation and fewer read operations are required to read the required data.

Figure 4A:
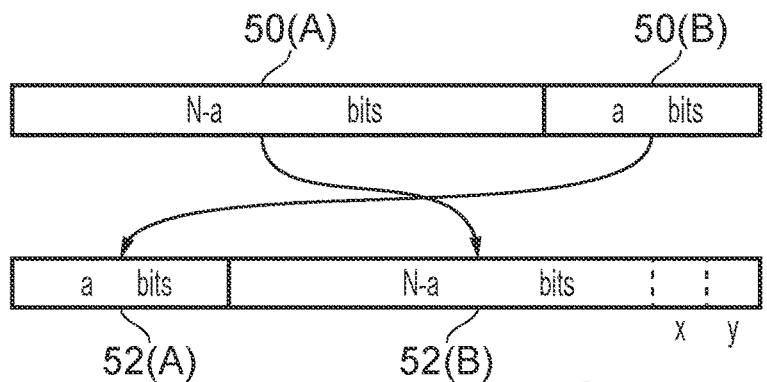
FIG. 4a schematically illustrates the effect of an addressing function on an address offset according to some example configurations.

FIGS. 4a-4d schematically illustrate details of an implementation of a strided addressing function. FIG. 4a illustrates the implementation of a strided addressing function where a single stride is made. The original physical location at which an entry of a next level page table is stored comprises a base portion and an index portion 50. The index portion 50 comprises N bits, where N is any positive integer. The index portion is divided into a least significant portion 50(B) comprising a number of bits a, where a is any positive integer less than N, and a more significant portion 50(A) comprising N-a (N minus a) bits. Application of the addressing function to the index portion of the storage location 50 results in the modified index portion of the storage location 52. In particular, the addressing function swaps the order of the more significant portion 50(A) and the least significant portion 50(B) to result in the modified index portion of the storage location 52 having a more significant portion 52(A) comprising a bits, and a least significant portion comprising N-a bits 52(B). The table on the right hand side of FIG. 4a illustrates the address offset of the original index portion 50 that is obtained by incrementing the two least significant bits of the least significant portion of the modified index portion 52(B). In other words, the table shows the address offset of the original index portion 50 associated with adjacent entries referred to in the modified index portion 52. By incrementing the modified indexing portion 52 by a single value, an address offset of $2^a$ is achieved. Hence, each pair of adjacent entries of the modified index portion corresponds to a pair of entries of the original index portion that was separated by $2^a$ entries.

Figure 4B:
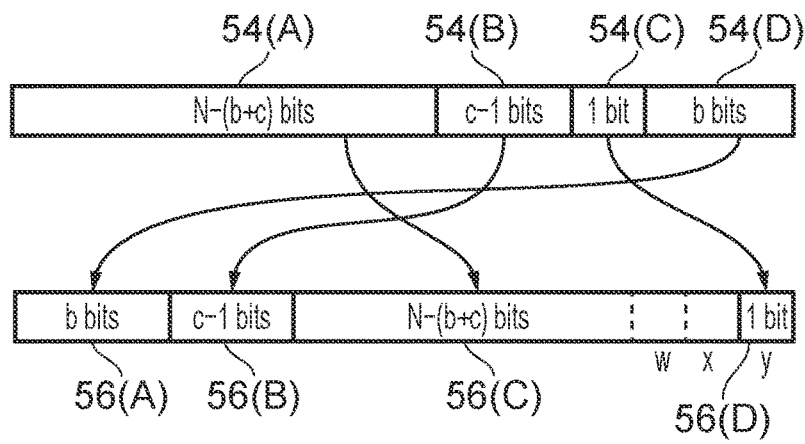
FIG. 4b schematically illustrates the effect of an addressing function on an address offset according to some example configurations.

FIG. 4b schematically illustrates the effect of an addressing function for a more complex strided pattern. In this case incrementing the modified index portion 56 causes the index to step through a pattern of entries of the original index portion 54, where the stride length alternates between sequential increments. In this case, the index portion (of length N bits, where N is any positive integer) is divided into a first portion 54(A), a second portion 54(B), a third portion 54(C) and a fourth portion 54(D) which are arranged in sequential order from the most significant portion (first portion 54(A)) to the least significant portion (fourth portion 54(D)). The fourth portion 54(D) is comprised of b bits, where b is a positive integer. The third portion 54(C) is 1 bit (one bit) long. The second portion 54(B) is c-1 (c minus 1) bits long and the first portion 54(A) is N-b-c (N minus b minus c) bits long, where (b+c)<N (the sum of b and c is less than N). The addressing function modifies the order of the first to fourth portions to generate the modified index 56. Specifically, the fourth portion 54(D) becomes the first modified portion 56(A) of the modified index 56; the third portion 54(C) becomes the fourth modified portion 56(D) of the modified index 56; the second portion 54(B) becomes the second modified portion 56(B) of the modified index 56; and the first portion 54(A) becomes the third modified portion 56(C) of the modified index function. The table on the right hand side of FIG. 4b illustrates the effect of incrementing the three least significant bits (labelled w, x, and y) of the modified index 56 on the corresponding address offset in the index 54. Incrementing the modified index 56 by 1 (w=x=0, y=1) corresponds to an address offset of $2^b$ in the index 54. Incrementing the modified index a second time by 1 (w=0, x=1, y=0) results in a total offset of $2^{(b+c)}$. This pattern is repeated with a further increment of the modified index 56 resulting in a total offset of $2^{(b+c)}+2^b$ in the original index 54. In this way the addressing function can be used to generate an alternating strided pattern with sequential increments of the modified index 56 resulting in alternating strides (differences between address of the index 54 that are adjacent in the modified index 56) of length $2^b$ and $2^{(b+c)}-2^b$.

Figure 4C:
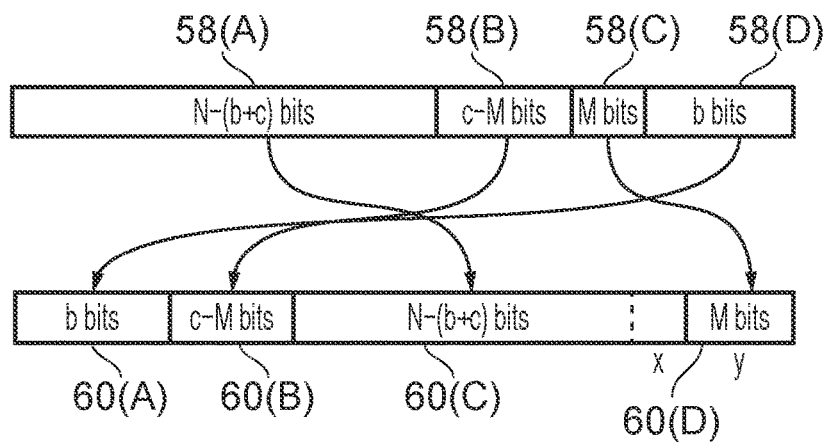
FIG. 4c schematically illustrates the effect of an addressing function on an address offset according to some example configurations.

FIG. 4c schematically illustrates a third alternative addressing function for generating a more complex strided pattern. In this case incrementing the modified index portion 60 causes the index to step through a pattern of entries of the original index portion 58, where the stride length alternates between sequential increments. In this case, the index portion (of length N bits where N is any positive integer) is divided into a first portion 58(A), a second portion 58(B), a third portion 58(C) and a fourth portion 58(D) which are arranged in sequential order from the most significant portion (first portion 58(A)) to the least significant portion (fourth portion 58(D)). The fourth portion 58(D) is comprised of b bits, where b is a positive integer. The third portion 58(C) is comprised of M bits, where M is a positive integer. The second portion 58(B) is c-M (c minus M) bits long, where c is a positive integer and M is less than c, and the first portion 58(A) is N-b-c (N minus b minus c) bits long, where (b+c)<N (the sum of b and c is less than N). The addressing function modifies the order of the first to fourth portions to generate the modified index 60. Specifically, the fourth portion 58(D) becomes the first modified portion 60(A) of the modified index 60; the third portion 58(C) becomes the fourth modified portion 60(D) of the modified index 60; the second portion 58(B) becomes the second modified portion 60(B) of the modified index 60; and the first portion 58(A) becomes the third modified portion 60(C) of the modified index function. The table on the right hand side of FIG. 4c illustrates the effect of incrementing the last M+1 bits of the modified index 60 on the corresponding address offset in the index 58. Incrementing the M bits of the fourth modified portion 60(D) of the modified index 60 corresponds to a stride length of $2^b$ in the original index function 58. Once the M least significant bits of the fourth modified portion 60(D) of the modified index 60 (corresponding to bits y in the table) have incremented to their maximum value, corresponding to $2^{M-1}$ strides of length $2^b$ through the sequence, a further increment of the modified index 60 causes a total address offset of the index 58 to be equal to $2^{b+c}$ which corresponds to an increment of $2^{b+c}-2^{1+b}$ from the previous modified index 60. This sequence of offsets then repeats. In this way a strided sequence in which a first stride length is repeated a number of times before a single instance of a different stride length is used can be mapped to contiguous locations using the addressing function. It would be readily apparent to the skilled person that the examples set out in FIGS. 4a to 4c are intended to be illustrative and that any reordering of any number of portions of an index to generate a modified index could be used for the addressing function dependent on the particular access pattern used.

Figure 4D:
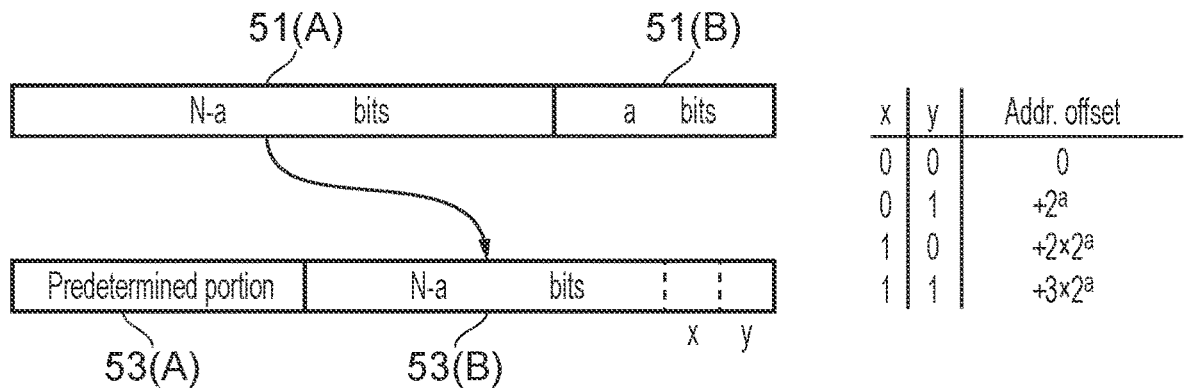
FIG. 4d schematically illustrates the effect of an addressing function on an address offset according to some example configurations.
Figure 5:
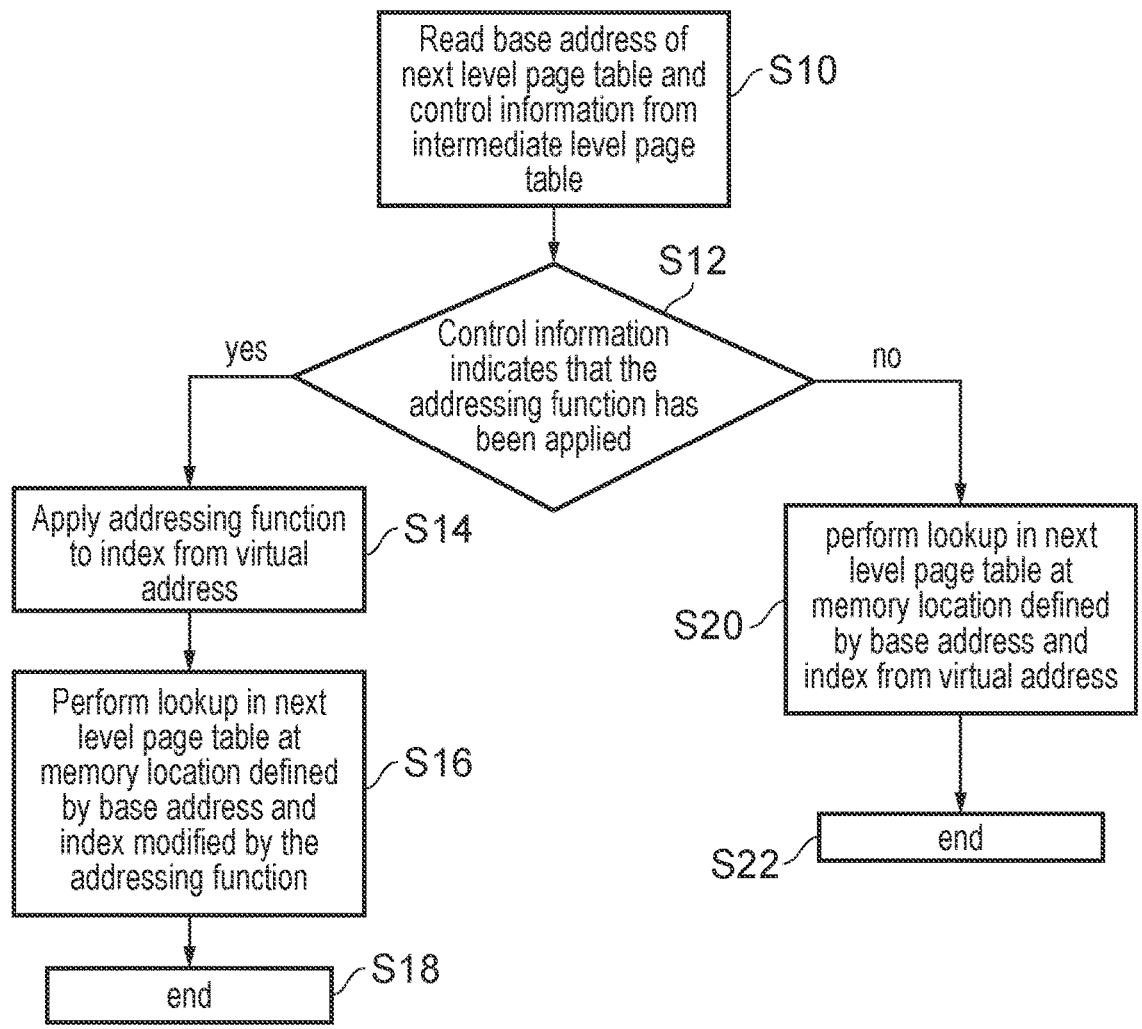
FIG. 5 schematically illustrates a sequence of steps that are carried out by the data processing apparatus according to some example configurations.

FIG. 4d illustrates the implementation of a strided addressing function where a single stride is made using an addressing function in which a least significant portion 51(B) of an index portion 51 is replaced with a predetermined portion 53(A). The original physical location at which an entry of a next level page table is stored comprises a base portion and an index portion 51. The index portion 51 comprises N bits, where N is any positive integer. The index portion is divided into a least significant portion 51(B) comprising a number of bits a, where a is any positive integer less than N, and a more significant portion 51(A) comprising N−a (N minus a) bits. Application of the addressing function to the index portion of the storage location 51 results in the modified index portion of the storage location 53. In particular, the addressing function swaps the order of the more significant portion 51(A) and the least significant portion 51(B) to result in the modified index portion of the storage location 53 and the least significant portion 51(B) is replaced with a predetermined portion such that the modified index portion 53 has a more significant portion 53(A) comprising an a bit long predetermined portion, and a least significant portion comprising N−a bits 53(B). The table on the right hand side of FIG. 4d illustrates the address offset of the original index portion 51 that is obtained by incrementing the two least significant bits of the least significant portion of the modified index portion 53(B). In other words, the table shows the address offset of the original index portion 51 associated with adjacent entries referred to in the modified index portion 53. By incrementing the modified indexing portion 53 by a single value, an address offset of $2^a$ is achieved. Hence, each pair of adjacent entries of the modified index portion corresponds to a pair of entries of the original index portion that was separated by $2^a$ entries FIG. 5 schematically illustrates a sequence of steps carried out by the translation circuitry according to some example configurations. Flow begins at step S10, where the address translation circuitry reads, from an intermediate level page table, a base address of the next level page table and corresponding control information. Flow then proceeds to step S12, where it is determined whether the control information indicates that the addressing function has been applied to the next level page table. If at step S12 it is determined that the control information indicates that the addressing function has been applied then flow proceeds to step S14. At step S14 the addressing function is applied to an index portion obtained from a virtual address associated with the lookup. Flow then proceeds to step S16 where a lookup is performed in the next level page table at a memory location defined using the base address and the index function as modified by the addressing function. Flow then ends at step S18. If at step S12 it was determined that the control information indicates that the addressing function has not been applied then flow proceeds to step S20. At step S20 the address translation circuitry performs a lookup in the next level page table at an memory location defined using the base address and the index obtained from the virtual address associated with the translation without applying the addressing function to the index. Flow then ends at step S22.

Figure 6:
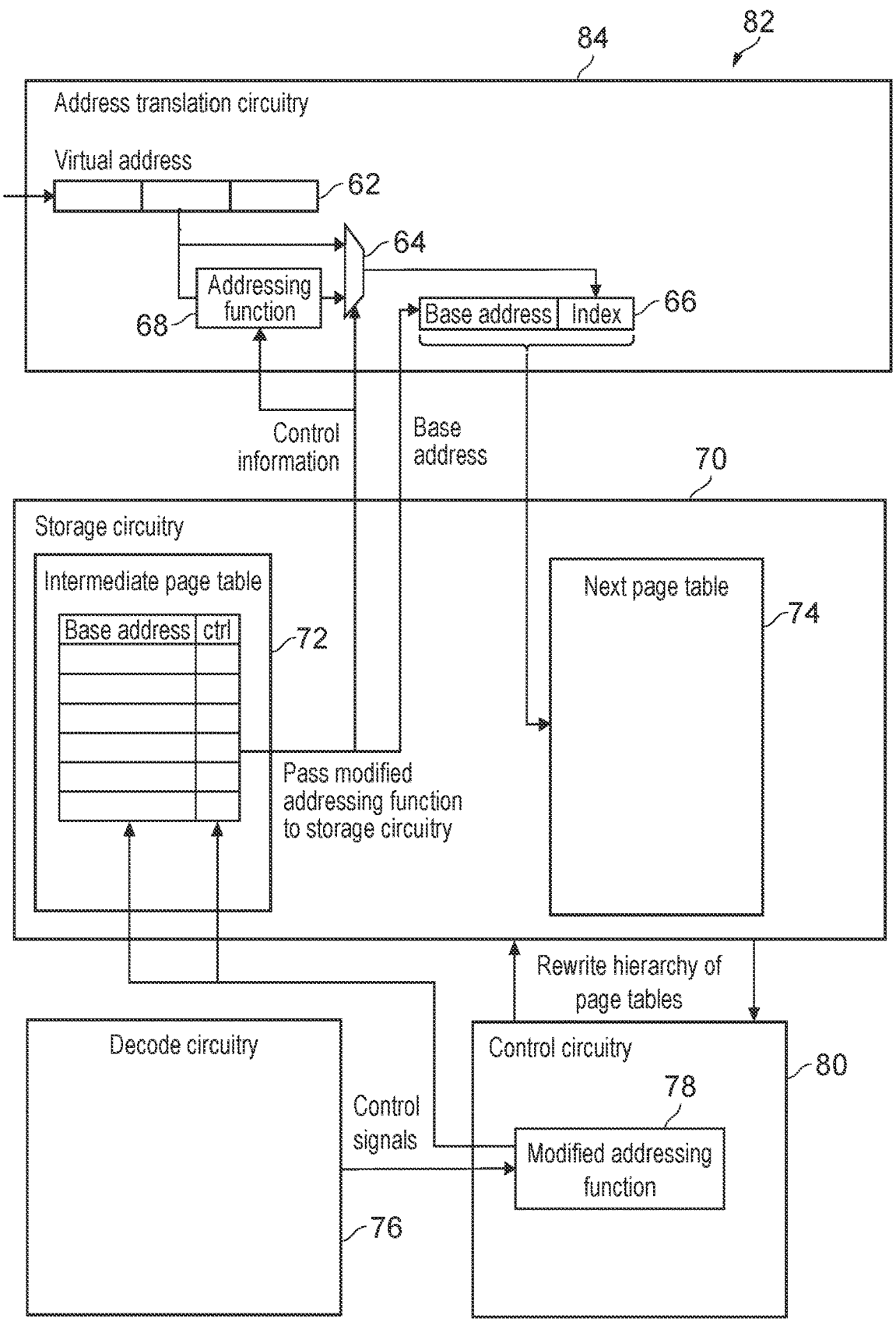
FIG. 6 schematically illustrates a data processing apparatus comprising address translation circuitry storage circuitry, decode circuitry and control circuitry according to some example configurations.

FIG. 6 schematically illustrates further details of a data processing apparatus 82 according to some example configurations. The data processing apparatus 82 is provided with address translation circuitry 84, storage circuitry 70 decode circuitry 76 and control circuitry 80. The translation circuitry 84 translates virtual address 62 to a physical address using a hierarchy of page tables 72, 76 stored in storage circuitry 70. The hierarchy of page tables comprises intermediate page table 72 and next level page table 74. Furthermore, the hierarchy of page tables could comprise a first level (L0) page table, any number of intermediate page tables and any number of next level pages tables. The intermediate level page tables 72 store a plurality of entries comprising base addresses and control information. The address translation circuitry performs the address translation using the methods that are described above and in relation to FIG. 1. The control circuitry 80 controls the rewriting of page tables in response to a modification to addressing information associated with the page tables. Modifying the addressing function comprises modifying the addressing function or modifying control information associated with one or more entries of the intermediate page table. The decode circuitry 76 is responsive to one or more architectural instructions to generate control signals that are passed to the control circuitry 80 to initiate the modification of the addressing function. The decode circuitry 76 is responsive to a first set of instructions that cause the control circuitry 80 to modify the control information of the intermediate page table 72.

When the control information is modified to set control information indicating that the addressing function 68 is applied to a particular entry of the intermediate level page table 72, the control circuitry 80 copies entries of the next level page table 74 that is indicated by the base address in the particular entry of the intermediate page table 72 to a new location and applies the addressing function 68 (which is also stored in storage circuitry 70) to generate new storage locations for the entries of the next level page table 74. Once the next level page table 74 has been copied to a new location the control circuitry 80 modifies the control information of the intermediate page table 72 to indicate that the addressing function has been applied and the control circuitry 80 modifies the base address of the particular entry of the intermediate page table 72 to point to the new next level page table.

When the control information is modified to set the control information to indicate that the addressing function 68 has not been applied to a particular entry of the intermediate level page table 72, the control circuitry 80 copies entries of the next level page table 74 that is indicated by the base address of the particular entry in the intermediate page table 72 to a new location and applies an inverse of the addressing function 68 to generate new storage locations from the entries of the next level page table 74. Once the next level page table 74 has been copied to a new location the control circuitry 80 modifies the control information of the intermediate page table 72 to indicate that the addressing function has not been applied and the control circuitry 80 modifies the base address of the particular entry of the intermediate level page table to point to the new next level page table.

When the addressing function is modified the control circuitry 80 passes the modified addressing function to storage circuitry. The current addressing function is retained in the storage circuitry until it is determined that there are no remaining page tables that have been reordered according to the current addressing function. The control circuitry 80 scans through the hierarchy of page tables to find next level page tables to which the current addressing function has been applied. In some example configurations a record may be kept identifying which next level page tables have been reordered according to the current addressing function. In further example configurations, the next level page tables that have been reordered based on the current addressing functions may not be updated to use the modified addressing function until the next instance in which the next level page table that has been reordered according to the current addressing function is accessed. When the next level page tables that have been reordered according to the current addressing function are identified, for each next level page table the entries are copied to a new location with a new base address. An indexing portion of the new location is defined by applying the modified addressing function to an original index which is obtained by applying an inverse to the current addressing function to an index portion of a current storage location of the entry of the next level page table. Once the page table entries of the next level page tables have been copied the corresponding base address stored in a corresponding entry of the intermediate page table is updated to point to the address of the next level page table that has been modified according to the new addressing function. In this way the control circuitry 80 is able to maintain and update the next level page tables when a modification is made to the addressing function or the control information.

Figure 7:
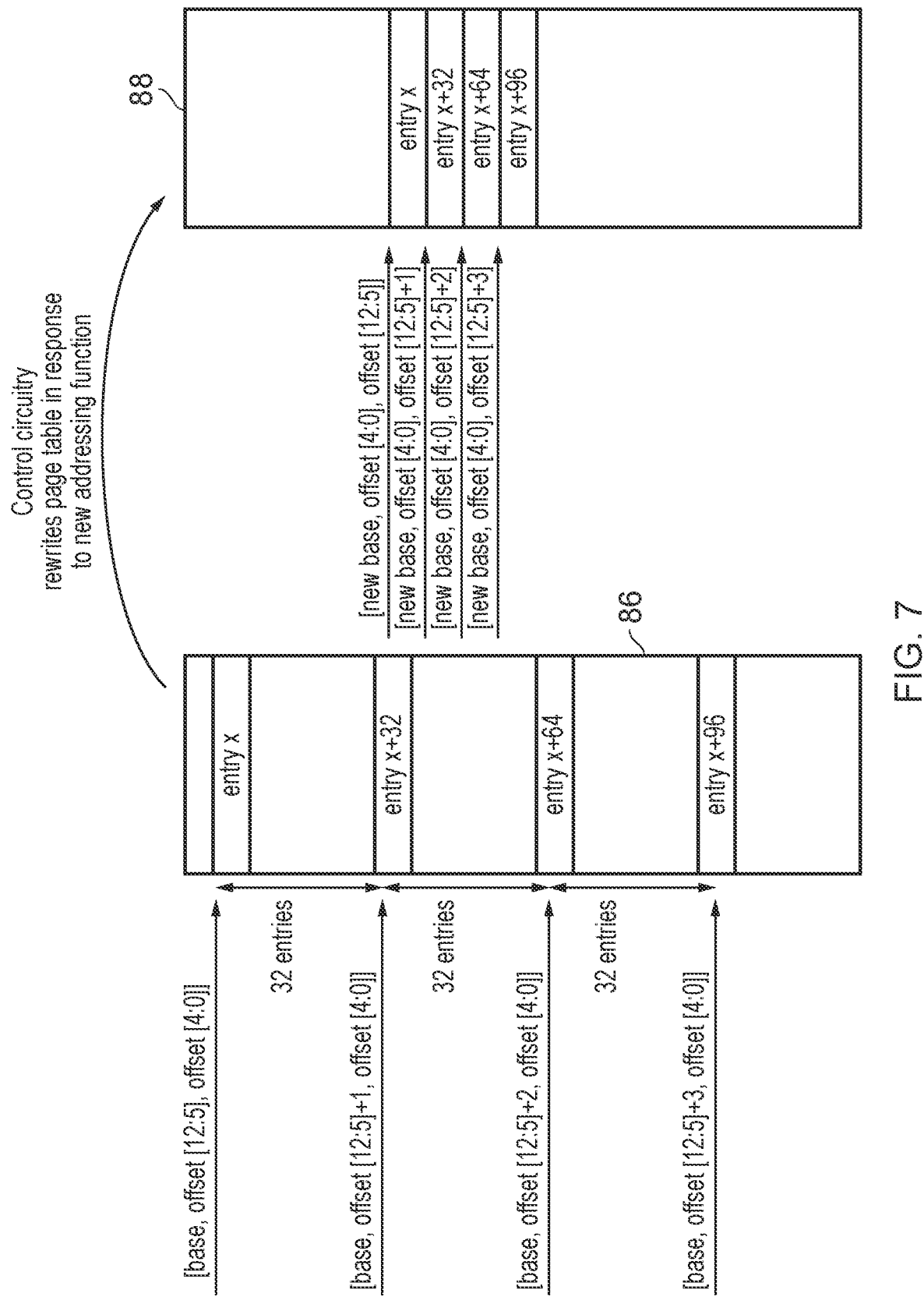
FIG. 7 schematically illustrates an effect of the addressing function according to some example configurations.

FIG. 7 schematically illustrates the reordering of entries of a next level page table 86 to generate a new next level page table 88 in accordance with some example configurations. In the illustrated embodiment the control circuitry applies the addressing function illustrated in FIG. 4a where the least significant portion of the offset (index) comprises 5 bits (bits 4 down to 0). The addressing function has been chosen to move entries x, x+32, x+64, and x+96 of the next level page table 86 to sequential locations in the new next level page table 88. As each of entries x, x+32, x+64, and x+96 is separated by 32 values, the five least significant bits of the offset are identical and the 8 more significant bits of the offset increment by a single value. Hence, the addressing function causes the new offset, that is generated by swapping the five least significant bits of the offset with the 8 more significant bits of the offset, to place the entries x, x+32, x+64, and x+96 of the next level page table 86 adjacent to each other in the new next level page table 88. The new next level page table 88 is stored at a new base address before the control circuitry 80 modifies the control information and the base address in the corresponding entry of the intermediate page table to point to the new next level page table. In some example configurations the new next level page table 88 is stored at the same base address as the next level page table 86 and overwrites the next level page table 86.

Figure 8:
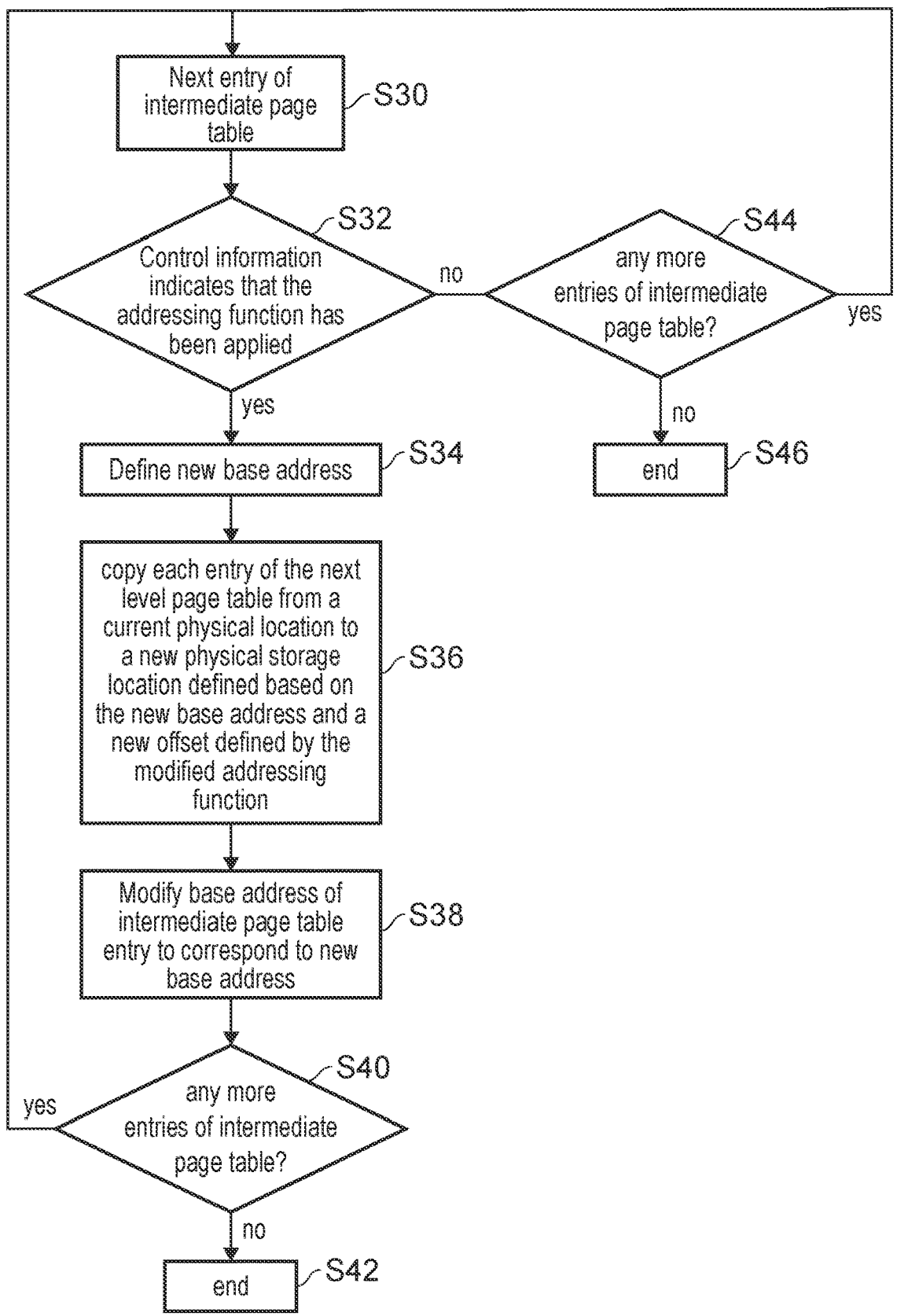
FIG. 8 schematically illustrates a sequence of steps that are carried out in accordance with some example configurations.

FIG. 8 schematically illustrates a sequence of steps carried out by the control circuitry 80 to update next level page table entries associated with an intermediate level page table when the addressing function is modified from a current addressing function to a modified addressing function. Flow begins at step S30 where the control circuitry 80 reads a next entry of the intermediate page table. Flow then proceeds to step S32 where it is determined whether the control information indicates that the addressing function has been applied. If no then flow then proceeds to step S44 where it is determined if there are any more entries of the intermediate page table. If yes then flow returns to step S30. In at step S44 it is determined that there are no more entries then flow ends at step S46. If at step S32 it was determined that the addressing function has been applied to the corresponding next level page table defined in the entry of the intermediate page table then flow proceeds to step S34 here a new base address is determined. Flow then proceeds to step S36 where each entry of the next level page table is copied from a current physical location to a new physical storage location defined from the new base address and a new index that is determined by applying the modified addressing function to an address obtained by applying an inverse of the current addressing function to the index portion of the current address. Flow then proceeds to step S38 where the base address of the entry of the intermediate page table is modified to correspond to the new base address. Flow then proceeds to step S40 where it is determined if there are any more entries of the intermediate page table. If yes then flow returns to step S30. In at step S40 it is determined that there are no more entries then flow ends at step S42.

In brief overall summary there is provided a data processing apparatus and method of data processing. The data processing apparatus comprises storage circuitry to store a hierarchy of page tables comprising an intermediate level page table. Each entry of the intermediate level page table comprises base address information of a next level page table and control information indicating whether an addressing function has been applied to reorder physical storage locations of entries of the next level page table. Address translation circuitry is provided to perform address translations in response to receipt of a virtual address by performing a lookup in a next level page table dependent on the base address information and a page table index from the virtual address. When the control information indicates that the addressing function has been applied, the lookup is performed at a modified storage location generated by applying the addressing function to the page table index.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

We claim:

1. A data processing apparatus comprising:
    storage circuitry to store a hierarchy of page tables comprising an intermediate level page table comprising a plurality of entries, each comprising corresponding base address information of a corresponding next level page table and corresponding control information indicating whether an addressing function has been applied to reorder physical storage locations of entries of the corresponding next level page table; and
    address translation circuitry to perform a virtual-to-physical address translation using the hierarchy of page tables in response to receipt of a virtual address, the virtual-to-physical address translation comprising performing a lookup in a next level page table dependent on base address information defined in an entry of the intermediate level page table and a page table index generated based on a portion of the virtual address,
    wherein irrespective of the control information of the entry, a base address used to access a physical storage location of the next level page table is generated from the entry of the intermediate level page table, and
    wherein the address translation circuitry is adapted such that:
    in response to control information of the entry indicating that the addressing function has been applied, the lookup in the next level page table is performed at a modified storage location within the next level page table identified by a modified page table index generated by applying the addressing function to reorder at least two sub-portions of the portion of the virtual address; and in response to control information of the entry indicating that the addressing function has not been applied, the lookup in the next level page table is performed at a storage location within the next level page table identified by the page table index generated from the portion of the virtual address without applying the addressing function.

2. The data processing apparatus of claim 1, wherein the addressing function maps a strided sequence of virtual addresses to a contiguous sequence of physical storage locations in the storage circuitry.

3. The data processing apparatus of claim 2, wherein the strided sequence comprises a stride length and each page table index generated from the strided sequence of virtual addresses differs from a preceding page table index generated from a preceding virtual address of the sequence of virtual addresses by the stride length.

4. The data processing apparatus of claim 2, wherein:
each page table index generated from the strided sequence of virtual addresses comprises a least significant portion and a more significant portion;
the least significant portion of each page table index is a same least significant portion; and
each more significant portion corresponds to a sequentially previous more significant portion incremented by a single value.

5. The data processing apparatus of claim 4, wherein the addressing function swaps an order of the least significant portion and the more significant portion.

6. The data processing apparatus of claim 4, wherein:
the least significant portion comprises a predetermined number of bits; and
the addressing function shifts the more significant portion by the predetermined number of bits towards the least significant end of the page table index, and introduces a predetermined portion at a more significant end of the page table index.

7. The data processing apparatus of claim 1, wherein the next level page table is a final level page table and each entry of the final level page table defines a physical address to be accessed based on a corresponding virtual address received by the address translation circuitry.

8. The data processing apparatus of claim 1, further comprising translation storage circuitry to store recently used virtual-to-physical address translations resulting from lookups in the hierarchy of page tables, wherein the control circuitry is adapted to perform a rewriting procedure to rewrite the next level page table in response to a modification to the control information.

9. The data processing apparatus of claim 8, wherein the control circuitry is adapted to perform the rewriting procedure by reordering entries of the next level page table.

10. The data processing apparatus of claim 8, wherein the control circuitry is adapted to retain validity of the virtual-to-physical address translations stored in the translation storage circuitry during the rewriting procedure.

11. The data processing apparatus of claim 8, wherein:
the modification comprises changing the control information to indicate that the addressing function is applied; and
the control circuitry is adapted to, when performing the rewriting procedure:

copy each entry of the next level page table from a current physical location defined based on a current offset from the base address information to a new physical storage location defined dependent on a new base address and a new offset;
define the new offset based on the addressing function and the current offset; and
modify the base address in the intermediate level page table to correspond to the new base address.

12. The data processing apparatus of claim 8, wherein:
the modification comprises changing the control information, from an indication that the addressing function has been used to map each entry of the next level page table from a corresponding original offset to a corresponding modified offset, to indicate that the addressing function is no longer to be applied when performing the lookup in the next level page table; and
the control circuitry is adapted to, when performing the rewriting procedure:
copy each entry of the next level page table from a current physical location defined based on the corresponding modified offset from the base address information to a new physical storage location defined based on a new base address and the corresponding original offset;
and
modify the base address in the intermediate level page table to correspond to the new base address.

13. The data processing apparatus of claim 1, further comprising translation storage circuitry to store recently used virtual-to-physical address translations resulting from lookups in the hierarchy of page tables, wherein the control circuitry is adapted to perform a rewriting procedure to rewrite the next level page table in response to a modification to the addressing function.

14. The data processing apparatus of claim 13, wherein:
the modification comprises changing the addressing function to a modified addressing function; and
the control circuitry is adapted to, when the control information indicates that the addressing function has been applied and when performing the rewriting procedure:
copy each entry of the next level page table from a current physical location defined based on a current offset from the base address information to a new physical storage location defined dependent on a new base address and a new offset;
the new offset is defined based on the modified addressing function, the addressing function, and the current offset; and
modify the corresponding base address to indicate the new corresponding base address.

15. The data processing apparatus of claim 14, wherein the control circuitry is adapted to define the new offset for each entry of the next level page table by applying the modified addressing function to a corresponding original offset obtained by applying an inverse to the addressing function to the current offset.

16. The data processing apparatus of claim 14, wherein the control circuitry is adapted to, when performing the rewriting procedure, rewrite, for each of the plurality of entries in the intermediate level page table with corresponding control information indicating that the addressing function has been applied, the corresponding next level page table.

17. The data processing apparatus of claim 1, wherein the physical storage locations are byte addressed.

18. The data processing apparatus of claim 1, wherein the control information comprises a contiguity bit representing a hint of sequential usage of a contiguous plurality of entries of the next level page table.

19. The data processing apparatus of claim 18, wherein:
when the control information indicates that the addressing function has not been applied, the contiguity bit indicates a contiguous plurality of entries of the next level page table and that the contiguous plurality of entries comprise redundant information, and
the addressing function modifies physical storage locations of the contiguous plurality of entries such that the redundant information is distributed in non-contiguous locations of the next level page table.

20. A data processing method comprising:
storing a hierarchy of page tables comprising an intermediate level page table comprising a plurality of entries, each comprising corresponding base address information of a corresponding next level page table and corresponding control information indicating whether an addressing function has been applied to reorder physical storage locations of entries of the corresponding next level page table; and
performing a virtual-to-physical address translation using the hierarchy of page tables in response to receipt of a virtual address, the virtual-to-physical address translation comprising performing a lookup in a next level page table dependent on base address information defined in an entry of the intermediate level page table and a page table index generated based on a portion of the virtual address,
wherein:
irrespective of the control information of the entry, a base address used to access a physical storage location of the next level page table is generated from the entry of the intermediate level page table;
in response to control information of the entry indicating that the addressing function has been applied, the lookup in the next level page table is performed at a modified storage location within the next level page table identified by a modified page table index generated by applying the addressing function to reorder at least two sub-portions of the portion of the virtual address; and
in response to control information of the entry indicating that the addressing function has not been applied, the lookup in the next level page table is performed at a storage location within the next level page table identified by the page table index generated from the portion of the virtual address without applying the addressing function.

* * * * *